(12) United States Patent
Suzuki et al.

(10) Patent No.: US 10,739,961 B2
(45) Date of Patent: Aug. 11, 2020

(54) DISPLAY APPARATUS FOR GRADUAL EXPANSION AND CONTRACTION OF SELECTED TEXT, AND DISPLAY METHOD

(71) Applicant: CANON KABUSHIKI KAISHA, Tokyo (JP)

(72) Inventors: Wataru Suzuki, Tokorozawa (JP); Shinya Takeichi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 15/098,184

(22) Filed: Apr. 13, 2016

(65) Prior Publication Data

US 2016/0306528 A1 Oct. 20, 2016

(30) Foreign Application Priority Data

Apr. 15, 2015 (JP) .................................. 2015-083614

(51) Int. Cl.
*G06F 3/0484* (2013.01)
*G06F 3/0488* (2013.01)

(52) U.S. Cl.
CPC ........ *G06F 3/04842* (2013.01); *G06F 3/0488* (2013.01)

(58) Field of Classification Search
None
See application file for complete search history.

(56) References Cited

U.S. PATENT DOCUMENTS

| | | | | |
|---|---|---|---|---|
| 2007/0209017 A1* | 9/2007 | Gupta | ................... | G06F 3/0485 715/781 |
| 2009/0228792 A1* | 9/2009 | van Os | ................. | G06F 3/0488 715/702 |
| 2013/0080979 A1* | 3/2013 | Weir | ....................... | G06F 3/033 715/856 |
| 2013/0145326 A1* | 6/2013 | Kim | .................... | G06F 3/04883 715/862 |
| 2015/0121298 A1* | 4/2015 | Ma | ........................ | G06F 3/0488 715/784 |
| 2015/0186005 A1* | 7/2015 | Roper | ................... | G06F 3/0488 715/765 |

FOREIGN PATENT DOCUMENTS

JP 2012-048497 A 3/2012

* cited by examiner

*Primary Examiner* — Abdullah Al Kawsar
*Assistant Examiner* — David V Luu
(74) *Attorney, Agent, or Firm* — Canon U.S.A., Inc. IP Division

(57) ABSTRACT

An apparatus includes a display control unit configured to explicitly indicate a selected range in a character string displayed on a display unit, an acceptance unit configured to accept a position pointed on the character string, and a selection control unit configured to gradually add one or more characters, which lie between a start character or an end character of the selected range in the character string and a character corresponding to the pointed position, to the selected range based on that the pointed position is outside an area in which the selected range is displayed, and gradually exclude one or more characters, which lie between the start character or the end character of the selected range and the character corresponding to the pointed position, from the selected range based on that the pointed position is in the area in which the selected range is displayed.

20 Claims, 15 Drawing Sheets

Due to the recklessness running in my family, I've always made loss since I was a child. When I was in the elementary school, I jumped off the second floor of the school. And, as a result, I hurt a waist for around 1 week. There may be the person who asks me the reason. There is not the serious reason.

Due to the recklessness running in my family, I've always made loss since I was a child. When I was in the elementary school, I jumped off the second floor of the school. And, as a result, I hurt a waist for around 1 week. There may be the person who asks me the reason. There is not the serious reason.

Due to the recklessness running in my family, I've always made loss since I was a child. When I was in the elementary school, I jumped off the second floor of the school. And, as a result, I hurt a waist for around 1 week. There may be the person who asks me the reason. There is not the serious reason.

Due to the recklessness running in my family, I've always made loss since I was a child. When I was in the elementary school, I jumped off the second floor of the school. And, as a result, I hurt a waist for around 1 week. There may be the person who asks me the reason. There is not the serious reason.

Due to the recklessness running in my family, I've always made loss since I was a child. When I was in the elementary school, I jumped off the second floor of the school. And, as a result, I hurt a waist for around 1 week. There may be the person who asks me the reason. There is not the serious reason.

1511, 1507

DISPLAY APPARATUS FOR GRADUAL EXPANSION AND CONTRACTION OF SELECTED TEXT, AND DISPLAY METHOD

BACKGROUND OF THE INVENTION

Field of the Invention

The present generally relates to displays and, more particularly, to a display apparatus equipped with a touch panel, and a display method.

Description of the Related Art

In touch panel-equipped devices typified by a smartphone and a tablet terminal, various operations can be performed with a finger or a stylus pen. One of such operations is an operation for range-selecting a part of a character string displayed on a device display unit and copying or pasting the selected character string. In some devices, such an operation can be performed by a touching on a display unit with a plurality of fingers simultaneously.

When a character string displayed on the device display unit is range-selected, however, a situation, in which part of the display unit is hidden from the sight of an operator by the finger(s) in the process of a touch operation, arises. This has caused a problem that the visual observation of the state of the range selection becomes difficult and the selection range may deviate in some cases. Japanese Patent Application Laid-Open No. 2012-048497 discusses performing a syntactic analysis on a character string to be selected to separate the character string into phrases. If a user passes the finger over a boundary between phrases when selecting the character string, a vibration function included in the device produces vibrations. According to such a method, the user can be notified of a rough indication of to what character the character string has been selected, by vibrations produced when the finger is passed over the boundaries of phrases.

However, according to Japanese Patent Application Laid-Open No. 2012-048497, there is a limit that the character string to be selected needs to be traced with a finger. Such a method may be not applicable to determining a selection range by specifying a start point and an end point. In addition, the selected range may be deviated when the finger is released from the display unit in a touch operation.

SUMMARY OF THE INVENTION

According to an aspect of the present disclosure, an apparatus includes a display control unit configured to explicitly indicate a character string being in a selected state in a character string displayed on a display unit, an acceptance unit configured to accept a position pointed on the character string, and a selection control unit configured to gradually add one or more characters, which lie between a start character or an end character of the character string being in the selected state and a character corresponding to the pointed position, to the character string being in the selected state based on that the pointed position is outside an area in which the character string being in the selected state is displayed, and gradually exclude one or more characters, which lie between the start character or the end character of the character string being in the selected state and the character corresponding to the pointed position, from the character string being in the selected state based on that the pointed position is in the area in which the character string being in the selected state is displayed.

Further features of the present disclosure will become apparent from the following description of exemplary embodiments with reference to the attached drawings.

BRIEF DESCRIPTION OF THE DRAWINGS

FIGS. 11A, 11B, 11C, 11D, 11E, and 11F are diagrams illustrating an example of a display state when the start point and the end point of a selection range are input.

FIGS. 12A, 12B, 12C, and 12D are diagrams illustrating an example of the display state when the start point and the end point of the selection range are input.

FIGS. 15A, 15B, 15C, 15D, and 15E are diagrams illustrating an example of a display state when the end point of a selection range is changed.

DESCRIPTION OF THE EMBODIMENTS

Figure 1:
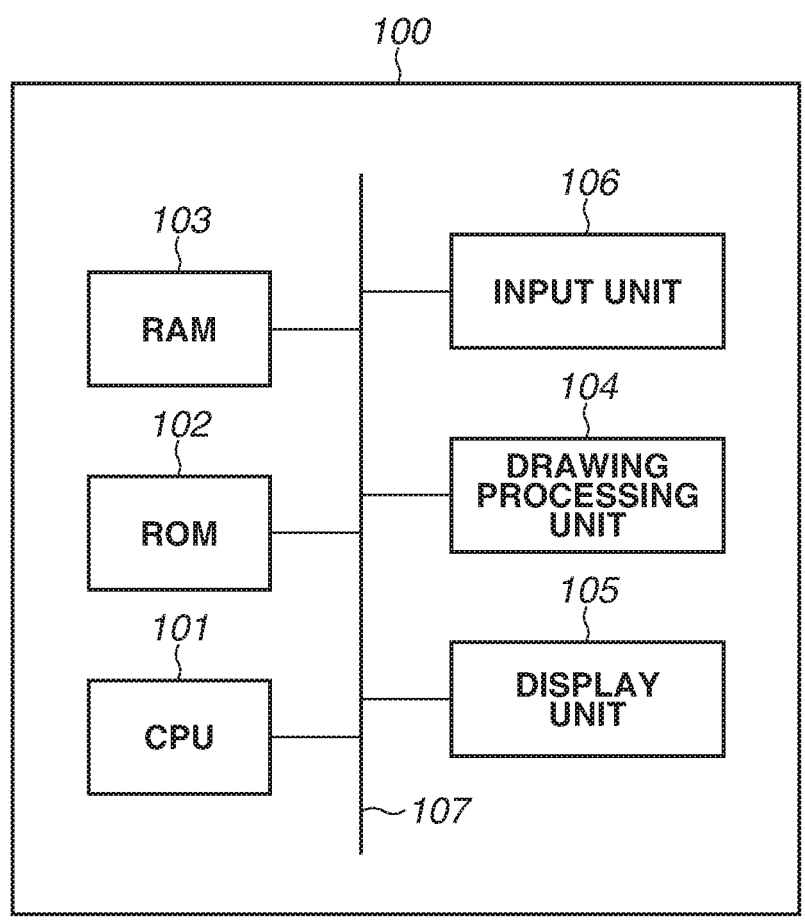
FIG. 1 is a block diagram illustrating an example of a hardware configuration according to an exemplary embodiment.

An exemplary embodiment of the present disclosure will be described below with reference to the drawings. The following exemplary embodiment is not intended to limit the present disclosure set forth in the claims. All combinations of features described in the present exemplary embodiment are not necessarily indispensable to the solving means of the present disclosure. In the following description, similar configurations will be designated by the same reference numerals.

A configuration of a display apparatus according to the present exemplary embodiment will be described with reference to the block diagram of FIG. 1. In FIG. 1, a central processing unit (CPU) 101 is a system control unit, may include one or more processors, and controls an entire display apparatus 100. A read-only memory (ROM) 102 stores programs and parameters that do not need to be changed. A random access memory (RAM) 103 is a rewritable memory which temporarily stores programs and data supplied from an external apparatus. A drawing processing unit 104 outputs graphics drawn by programs. As used herein, the term "unit" generally refers to any combination of software, firmware, hardware, or other component, such as circuitry, that is used to effectuate a purpose.

A display unit 105 displays graphics drawn by the drawing processing unit 104 and a user interface. An input unit 106 receives an input from a user. A mouse, a keyboard, and a touch panel are applicable to the input unit 106. A system bus 107 communicably connects the units 101 to 106 to each other.

A touch panel is a pointing device that acquires position information about where a pointer is detected to be in contact with or in proximity to on a display screen of a display panel as the pointer is pointed at the display screen. Although the term touch panel is used, making a touch, i.e., a contact is not an indispensable condition for the detection of a position by the touch panel. The present exemplary embodiment is applicable to both a touch panel that detects a position where the pointer is in contact with the panel surface and a touch panel that detects a position where the pointer is in proximity to the panel surface. The touch panel is stacked on the display panel, and includes a sensor that detects the position where the pointer comes in contact with or in proximity to on the display screen.

Using such a sensor, the touch panel can detect the position specified by the pointer on the display screen, and a moving path and a moving speed of the position pointed by the pointer. Examples of the pointer used to operate the touch panel include a user's finger, a stylus, and a touch pen. The touch panel detects the position where the pointer is in contact with or in proximity to on the display screen as coordinates. The coordinates detected by the touch panel are transmitted to a system control unit, and predetermined processing is performed.

Touch panels of any method, including pressure sensitive touch panels, electrostatic touch panels, and optical touch panels, may be used as the touch panel. A pressure sensitive touch panel detects a change in pressure when the panel is pressed by the pointer. An electrostatic touch panel detects an electrical signal resulting from static electricity due to a touch of the pointer on the panel. An optical touch panel typically detects a position and a moving direction of the pointer in contact with the panel by using an optical sensor or sensors arranged on an outer frame of the display panel.

Contact type touch panels for detecting a contact of a pointer (for example, the aforementioned pressure sensitive touch panels and electrostatic touch panels) are commonly used. The user can make various operations on the display apparatus 100 by pressing (tapping on) the surface of the touch panel with a finger or stylus, or moving the pressing finger or stylus.

Recording media other than the ROM 102 may be used to supply program code to the above-described configuration. For example, a flexible disk, a hard disk, an optical disk, a magneto-optical disk, a compact disc read only memory (CD-ROM), a compact disc recordable (CD-R), a magnetic tape, a memory card, and/or a digital versatile disc (DVD) may be added to the configuration of the display apparatus 100 according to the present exemplary embodiment.

In a first exemplary embodiment, an example of selecting a range of a display content displayed on a display equipped with an electrostatic touch panel by a touch operation will be described with reference to the drawings. Herein, a case of partially selecting a displayed character string by a touch operation will be described as a specific example.

Figure 2:
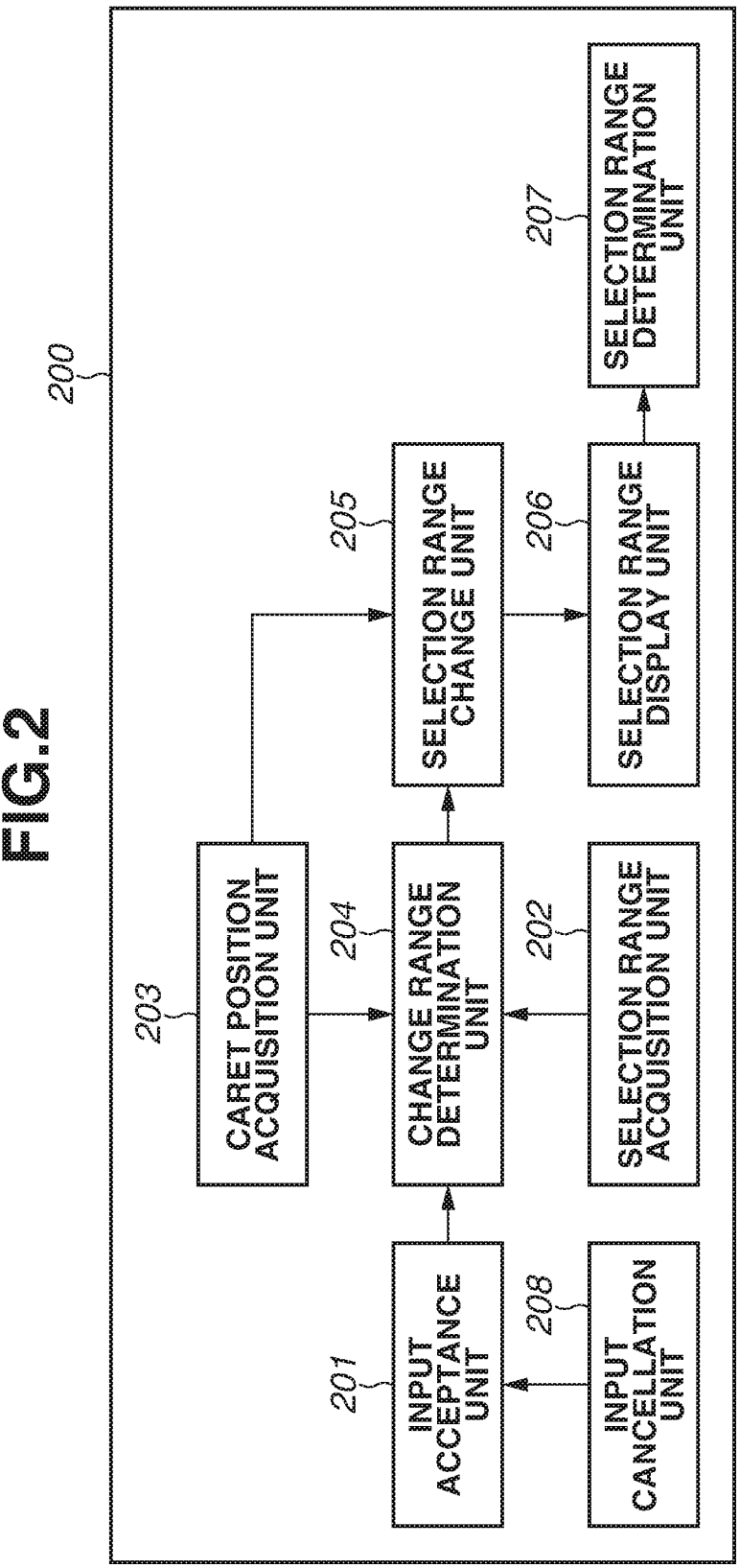
FIG. 2 is a diagram illustrating an example of a functional configuration according to the present exemplary embodiment.

FIG. 2 is a block diagram illustrating functional units incorporated in the display apparatus 100 to which the present exemplary embodiment is applied. Such functional units are implemented by the CPU 101 loading a program stored in the ROM 102 into the RAM 103 and performing processing according to flowcharts to be described below. For example, if hardware is configured as an alternative to the software processing using the CPU 101, arithmetic units and circuits corresponding to the processing of the respective functional units described below can be configured.

Figure 3:
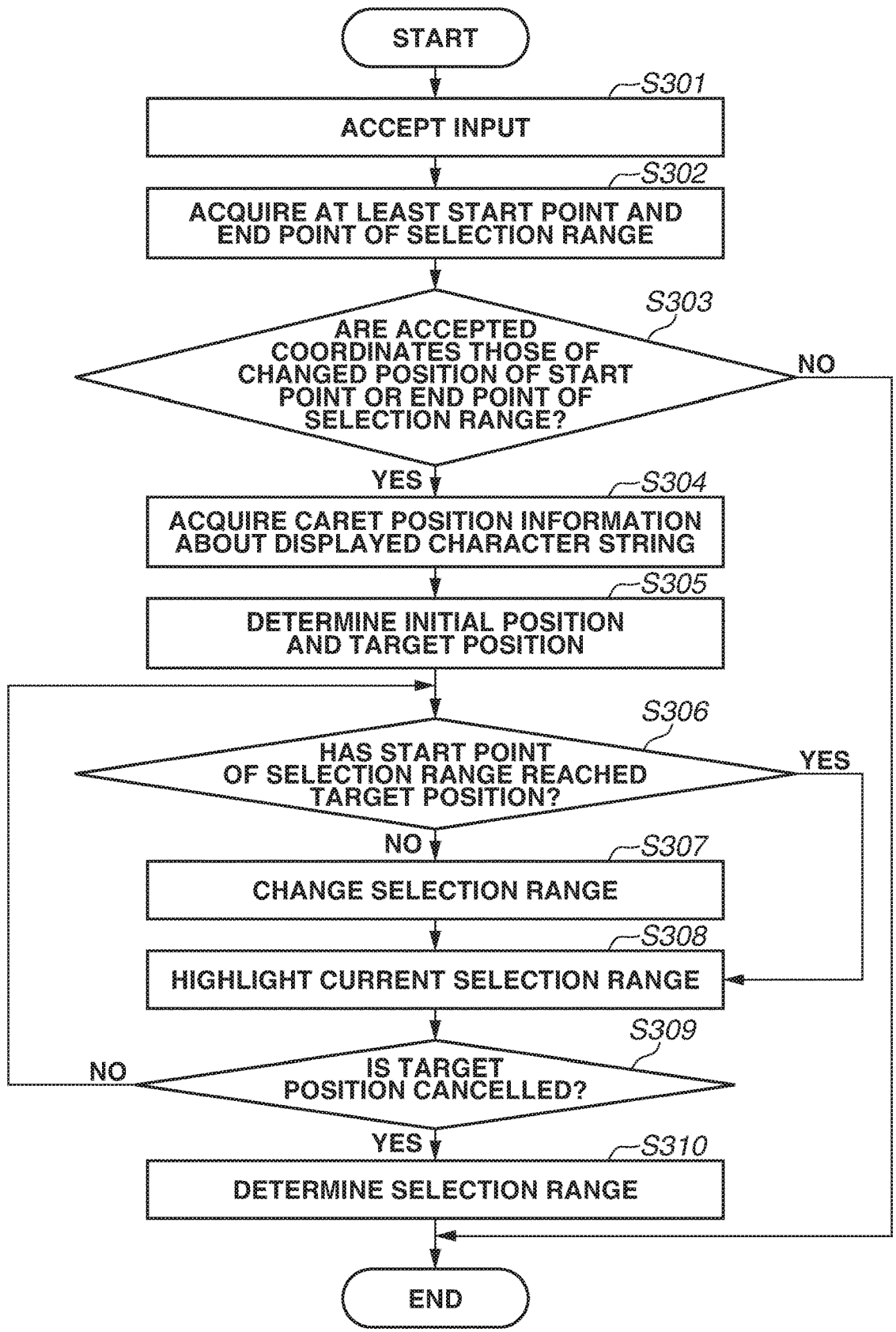
FIG. 3 is a flowchart illustrating an example of a processing flow for selecting a range.

FIG. 3 illustrates an example of a processing flow for selecting a range of a character string by a touch operation. The processing starts with a state where a part of a character string displayed on the touch panel has already been range-selected. The processing determines a selection range by changing a position of a start point or an end point of the range.

In step S301, an input acceptance unit 201 in a control unit 200 of the display unit 100 illustrated in FIG. 2 accepts an input of position information for selecting a range. The input accepted in this step is the coordinates of at least either one of the start point and the end point of the range to be selected. The coordinates may be those of a changed start point or a changed end point of an already-selected range. The input acceptance unit 201 accepts a caret position close to a pointed position detected by the touch panel as an input position. In general, a caret refers to a vertical bar displayed at a position where a character is input in a text field. It is also called a cursor. A caret position refers to a position where an input character can be inserted on a text input screen. In a visual sense, a caret position corresponds to a position between one character and another character. In the present exemplary embodiment, the start point of a selection range refers to a caret position that defines a start character of the selection range. The end point of the selection range refers to a caret position that defines an end character of the selection range. Typically, if a character string is partially selected, the selection range is explicitly indicated. For example, the selection range is enclosed in on the display screen.

In step S302, if there is an already-selected range, a selection range acquisition unit 202 acquires at least a start point and an end point of the selection range (already-selected range). Position information about the start point and the end point of the selection range may be the numbers of characters from the beginning of the displayed character string. In the present exemplary embodiment, the coordinates on the touch panel are assumed to be used.

In step S303, whether the coordinates accepted by the input acceptance unit 201 are those of a changed position of the start point or end point of the selection range is determined. If the coordinates are not those of a changed position of the start point or the end point of the selection range (NO in step S303), the processing ends. If the coordinates are those of a changed position of the start point or the end point of the selection range (YES in step S303), then in step S304, a caret position acquisition unit 203 acquires caret position information about the displayed character string.

In the present exemplary embodiment, the coordinates of a boundary between one character and another character will be referred to as a caret position. In the present exemplary embodiment, a caret position corresponding to the position of a character refers to the boundary between the character and the previous character, or the boundary between the character and the subsequent character. The caret position that defines the start character of a selection range refers to the boundary between the first character of the selection range and the previous character. In other words, the character string preceding the caret position is not selected, and the character string following the caret position is in a selected state. The caret position that defines the end character of a selection range refers to the boundary between the last character of the selection range and the subsequent character. In other words, the caret position that defines the end character of a selection range means that the character string preceding the caret position is in a selected state, and the character string following the caret position is not selected. The start point acquired in step S302 is the caret position immediately preceding the first character of the selection range. The end point is the caret position immediately following the last character of the selection range.

A method for displaying marks, such as a cursor, at the start point and the end point of an already-selected range, and moving the position of a cursor by a touch operation to change the selection range will be described with reference to FIGS. 4A to 4F.

In the present exemplary embodiment, a series of processes is performed with a boundary between one character and another as a caret position. However, for example, a boundary between one word and another may be used as a caret position. Depending on the language in which the display content is written, different types of caret positions may be used as appropriate. For example, a boundary between one word and another may be used to define the start point of a selection range. A boundary between one character and another may be used to define the end point of the selection range.

<Expanding Selection Range>

FIGS. 4A to 4F illustrate a display state of the touch panel when the start point of a selection range for partially selecting a character string expressing Japanese text is changed by a touch operation. The display content in each of FIGS. 4A to 4F includes 11 lines of character string with nine characters per line. A part of the character string is in a selected state and enclosed in a shaded portion.

Figure 4A:
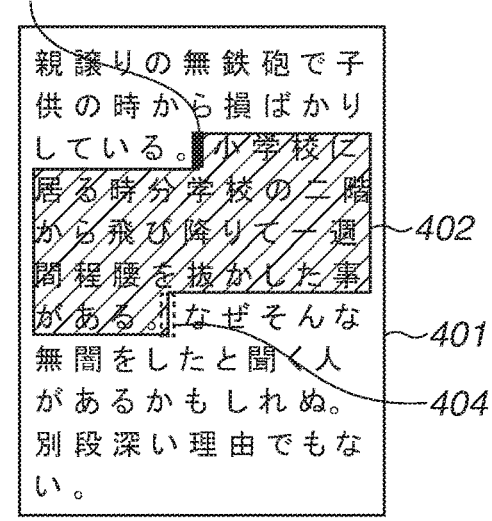
FIGS. 4A, 4B, 4C, 4D, 4E, and 4F are diagrams illustrating an example of a display state when a start point of a selection range is changed.

FIG. 4A illustrates a state where a selection range 402 is already selected in the character string displayed on a touch panel 401. The caret positions corresponding to the start point and the end point of the selection range 402 are illustrated as a caret position 403 and a caret position 404, respectively. In the following description, the selection range 402 may be referred to simply as "range 402." In FIG. 4A, a caret is displayed in the caret position 403.

An operation for moving the caret from the caret position 403 to a caret position 407 will be described with reference to FIG. 4B.

The input acceptance unit 201 accepts an input that a touch position (a "touch position" refers to a position indicated by the coordinates detected by the touch panel, different from a "caret position" defined between characters) 405 is touched. In step S305, a change range determination unit 204 determines the caret position 403 to be an initial position, and a caret position near the touch position 405 to be a position to which a start character is moved (hereinafter, referred to as a target position).

The initial position is a caret position corresponding to the start point or the end point of the selection range when a change of the range is started. The target position is a caret position that defines the start character or the end character of the selection range when the change of the range ends.

Figure 4B:
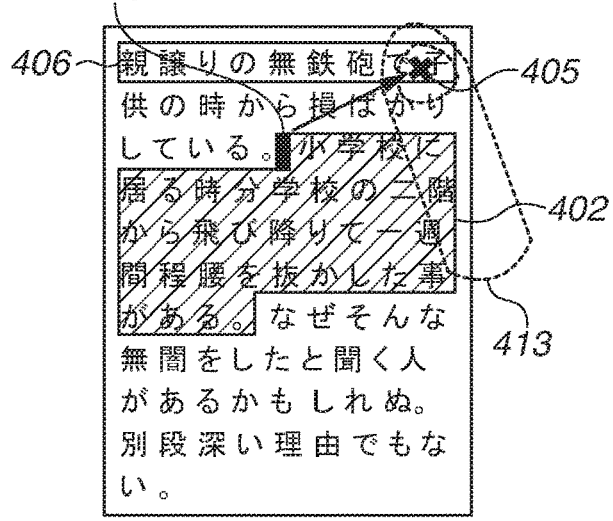

In the case of FIG. 4B, the caret position 403 corresponding to the start point of the selection range 402 is close to the touch position 405. In other words, the start point of the range 402 is to be changed, and the initial position is the caret position 403.

The target position is either one of caret positions immediately before and immediately after the x coordinate of the touch position 405 on a character string line 406 corresponding to the touch position 405.

The touch position 405 is located in front of the start point of the range 402 in terms of the arrangement of the character string, and serves as the start point of the selection range after the change. The target position is thus the caret position 407 illustrated in FIG. 4C, the caret position immediately before the x coordinate of the touch position 405.

Figure 4C:
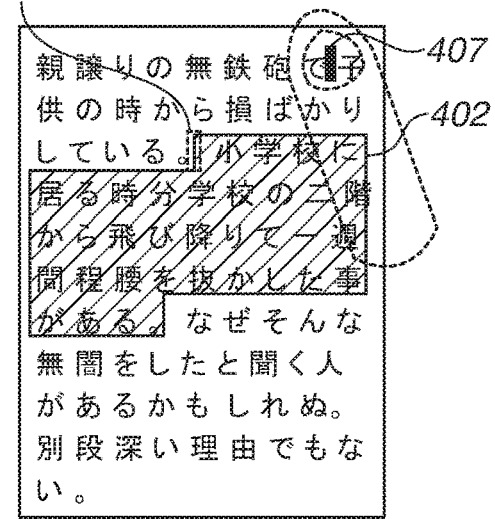
Figure 4D:
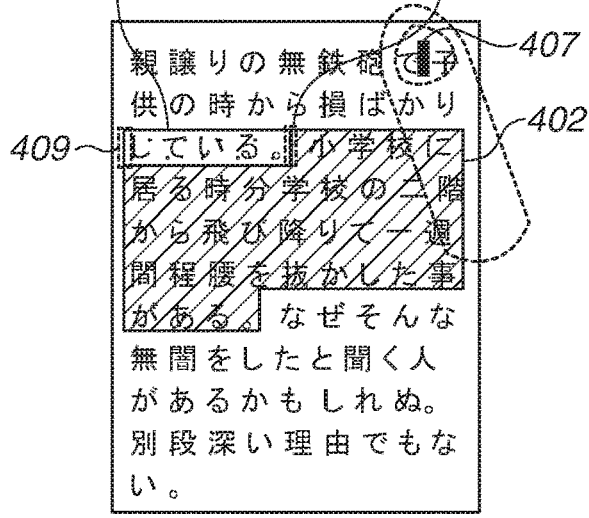

FIG. 4C illustrates a state where the caret is displayed in the caret position 407. FIG. 4D illustrates a state where the start point of the selection range 402 is moving toward the caret position 407. The start point of the selection range 402 is displayed in a caret position 409.

In step S306, the start point of the range 402 is moved with time, and whether the start point of the range 402 has reached the caret position 407, which is the target position, is determined.

If the start point of the selection range 402 is determined to have not reached the caret position 407 (NO in step S306), then in step S307, a selection range change unit 205 changes the selection range 402 by gradually moving the start point or the end point of the range 402 based on the initial position and the target position. The selection range can be expanded or narrowed depending on a positional relationship between the initial position and the target position.

In FIG. 4C, the caret position 407, the target position, is located in front of the caret position 403, the initial position, in terms of the arrangement of the character string. The selection range change unit 205 thus changes the selection range 402 to expand. In other words, if the position pointed by the pointer is outside the selection range 402, the selection range change unit 205 gradually adds a character or characters lying between the start point of the selection range 402 and the character corresponding to the pointed position to the selection range 402.

In the present exemplary embodiment, an animated display of expanding the selection range 402 in a discrete manner with time is assumed to be provided by moving the start point of the range 402 to approach the target position from the initial position. Here, the start point of the range 402 is moved at a speed with which the movement of the start point of the range 402 is recognizable by the human eye. The speed with which the movement of the start point of the range 402 is recognizable by the human eye is a speed slower than a predetermined reference speed. The speed at which the start point or the end point of the selection range 402 is moved does not need to be constant. The speed may be changed according to the current position of the selection range and the target position. For example, the closer to the target position, the slower the speed may be made. An animated display may be provided such that the selection range 402 expands smoothly in units of a width smaller than one character or one word independent of the caret position.

In FIG. 4C, there are 15 characters between the caret position 403 and the caret position 407. For example, to change the start point of the selection range 403 to reach the caret position 407 in three seconds, the selection range change unit 205 can move the start point of the selection range 402 so that the start point approaches the caret position 403 by one character per 3 seconds/15 characters=0.2 seconds. If an end of the selection range 402 thus moves by one character per 0.2 seconds, the character-by-character movement is recognizable to the human eye. Consequently, the start point of the selection range 402 can be easily observed to have reached the desired caret position. For example, the start point or the end point on the move may be temporarily stopped each time the start point or the end point reaches the next caret position.

Figure 4E:
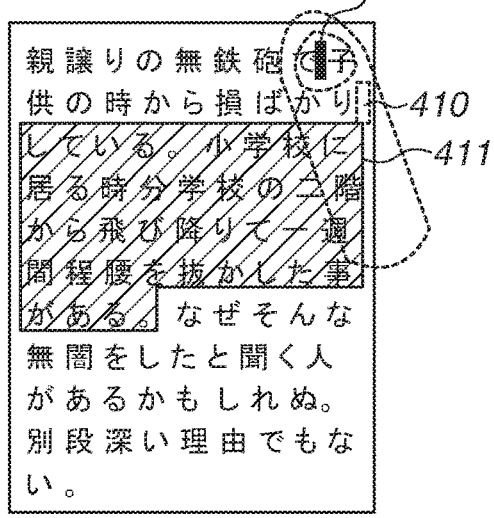

FIG. 4D illustrates a state one second after the start point of the range 402 starts moving from the caret position 403. A range 408 is a new expanded range. For the sake of convenience, the range 408 is illustrated with a background pattern distinct from that of the range 402. However, the range 408 may be highlighted with the same background pattern. The caret position 409, which is the start point of the range 408 here, is at the left end of the touch panel 401. After the lapse of one second, as illustrated in FIG. 4E, the start point of the range 408 is moved from a caret position 410 at the end of the previous line toward the caret position 407. The caret positions 409 and 410 have different coordinates but represent the boundary of the same characters. The caret positions 409 and 410 are therefore regarded as the same caret position. A range 411 is a union of the ranges 402 and 408 in FIG. 4D.

In the present exemplary embodiment, caret positions are set at a distance of every one character. An example of calculating the speed in units of one character has thus been described. However, based on the language in which the character string is written, the speed may be determined in units of one word as with the distances between caret positions.

In step S308, a selection range display unit 206 highlights the selection range at that point in time based on the change made by the selection range change unit 205. As another method for explicitly indicating the selection range to the operator (user), the selection range display unit 206 may change the color of the character string included in the selection range. The selection range display unit 206 may display the character string included in the selection range in bold type.

In step S309, after the current selection range is displayed in step S308, whether the target position determined by the input accepted by the input acceptance unit 201 is cancelled by an input cancellation unit 208 is determined.

In the present exemplary embodiment, the coordinates of the start point or the end point of the selection range specified by a touch operation are accepted by the input acceptance unit 201, and the target position is determined. The target position is regarded as being effective while the operator's finger 413 is in contact with the touch panel 401. If the finger 413 is released from the touch panel 401, the cancellation of the target position is accepted. In other words, the start point or the end point of the selection range is moved while the pointing by the pointer is continued. The movement is ended according to an end of the pointing.

In step S309, if the target position is determined not to be cancelled (NO in step S309), the processing returns to step S306. If the selection range at that point in time has reached the target position (YES in step S306), the processing of step S307 is omitted. In step S309, if the target position is determined to be cancelled (YES in step S309), then in step S310, a selection range determination unit 207 determines the range highlighted at that point in time to be the selection range. Then, the processing ends.

Figure 4F:
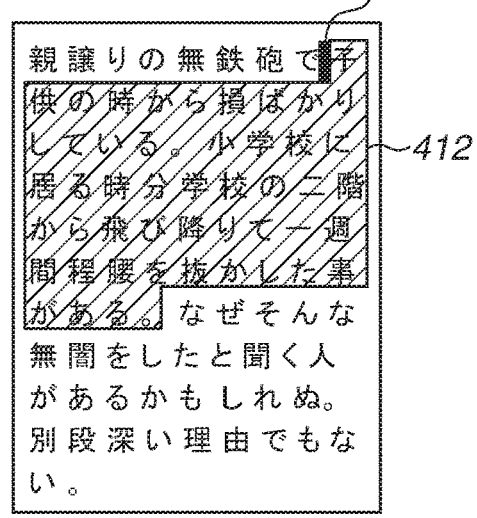

FIG. 4F illustrates a state where three seconds has elapsed from the start of the change of the selection range, and the start point of the selection range has reached the caret position 407. If the start point of the selection range has reached the caret position 407 which is the target position (YES in step S306), the processing skips step S307 (without changing the selection range) and proceeds to step S308 to maintain the display state of the current selection range. That is, if the finger 413 is still in contact with the touch panel 401, the selection range stops being changed and continues to be highlighted.

If the operator's finger 413 is released from the touch panel 401, the input is cancelled (YES in step S309). In step S310, the selection range determination unit 207 determines the selection range.

<Narrowing Selection Range>

The processing when the start point of the already-selected range is moved to a front position in terms of the arrangement of the character string to change the selection range has been described above. Now, processing for moving the start point to a caret position in the already-selected range to change the selection range will be described according to the processing flow of FIG. 3.

Figure 5A:
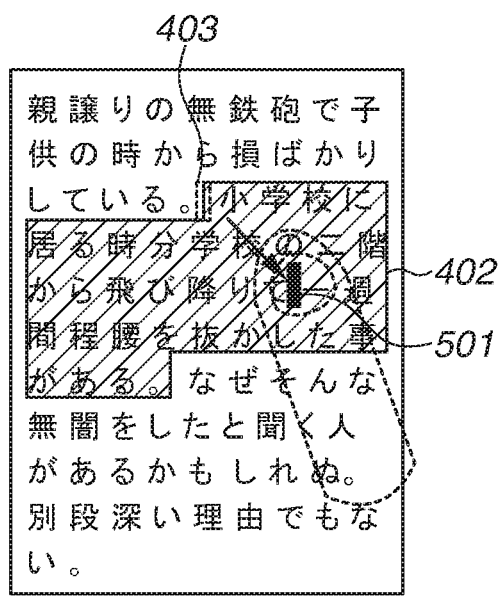
FIGS. 5A, 5B, and 5C are diagrams illustrating an example of the display state when the start point of the selection range is changed.
Figure 5B:
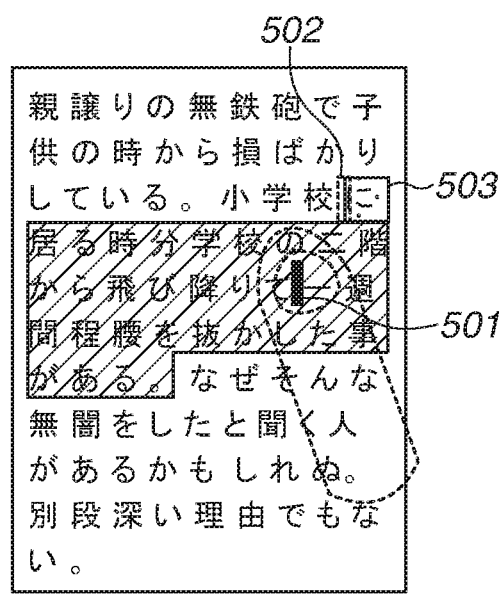
Figure 5C:
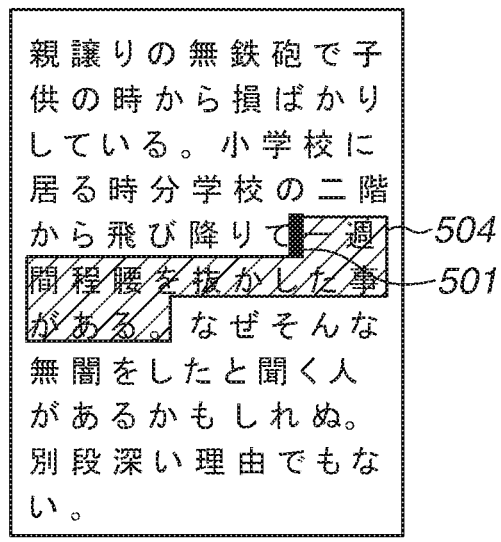

FIGS. 5A to 5C are diagrams illustrating a display state of the touch panel in such processing. The initial state is the same as that of FIG. 4A, where the range 402 is already selected.

In FIG. 5A, the start point of the range 402 is moved from the caret position 403 to a caret position 501 by a touch operation. In step S301, the input acceptance unit 201 accepts the change of the start point of the range 402. The processing of steps S302 to S306 is similar to the foregoing. A description thereof will thus be omitted.

In step S307, the selection range change unit 205 changes the range 402 to be narrower since the caret position 501 is in the range 402 and is located behind the caret position 403 in terms of the arrangement of the character string. In the present exemplary embodiment, if the position pointed by the pointer is in the selection range, the character(s) lying between the start point of the selection range and the character corresponding to the pointed position is/are thus excluded from the selection range gradually.

FIG. 5B illustrates that the start point of the range 402 is moved from the caret position 403 to a caret position 502, whereby the first line part above the range 402 is narrowed to a range 503.

FIG. 5C illustrates a state when the change of the range has advanced and the start point of a range 504 reaches the caret position 501, the target position.

Processing for moving the start point of the already-selected range to behind the end point of the selection range to change the selection range will be similarly described according to the processing flow of FIG. 3. FIGS. 6A to 6E are diagrams illustrating a display state of the touch panel in such processing. The initial state is the same as that of FIG. 4A, where the range 402 is already selected.

<Setting Start Point of New Selection Range Behind End Point of Existing Selection Range>

Figure 6A:
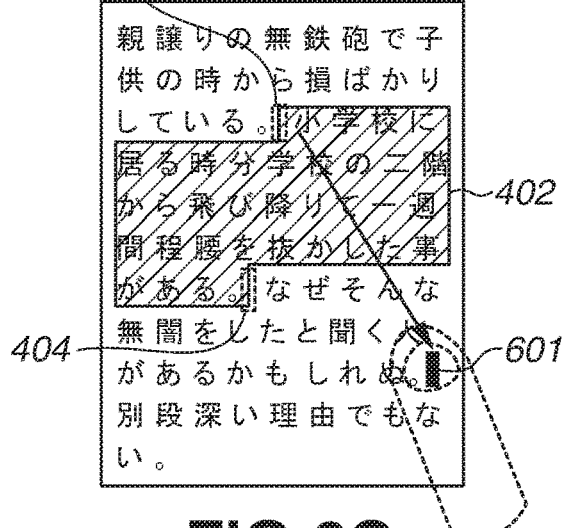
FIGS. 6A, 6B, 6C, 6D, and 6E are diagrams illustrating an example of the display state when the start point of the selection range is changed.

In FIG. 6A, the start point of the range 402 is moved from the caret position 403 to a caret position 601 by a touch operation. In step S301, the input acceptance unit 201 accepts the change of the start point of the range 402. The processing of steps S302 to S306 is similar to the foregoing. A description thereof will thus be omitted.

In step S307, the caret position 601 is located behind the caret position 404, the end point of the range 402, in terms of the arrangement of the character string.

If the destination to which the start point of the range 402 is moved falls between the caret position 403 and the caret position 404 (i.e., until the start point of the selection range 402 reaches the caret position 404), the selection range change unit 205 changes the range 402 to be narrower.

Figure 6B:
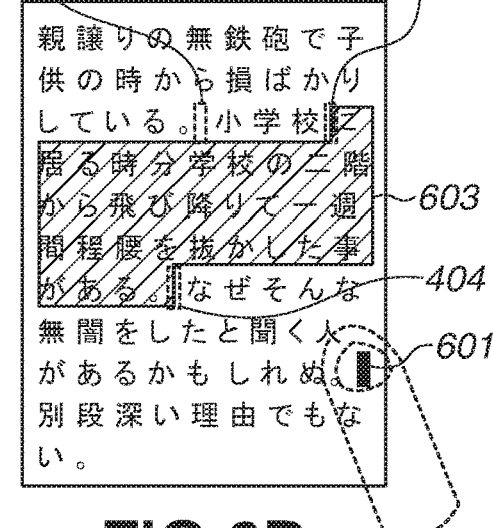

FIG. 6B illustrates such a state. The range 402 here is narrowed to a range 603 with a caret position 602 as the start point.

Figure 6C:
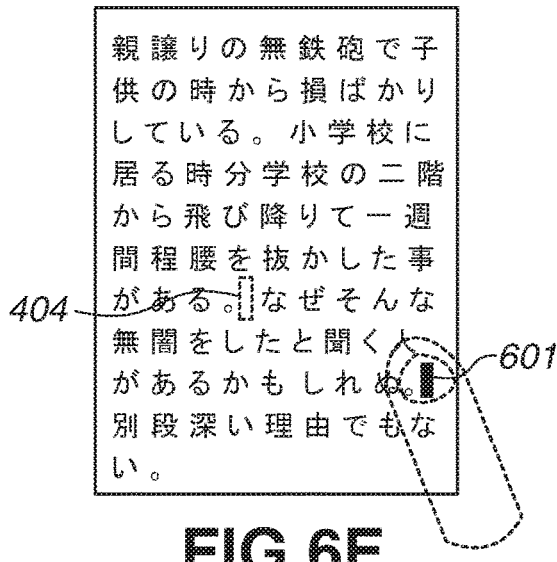

As illustrated in FIG. 6C, if the start point of the range 603 reaches the caret position 404, the selection range temporarily disappears.

Figure 6D:
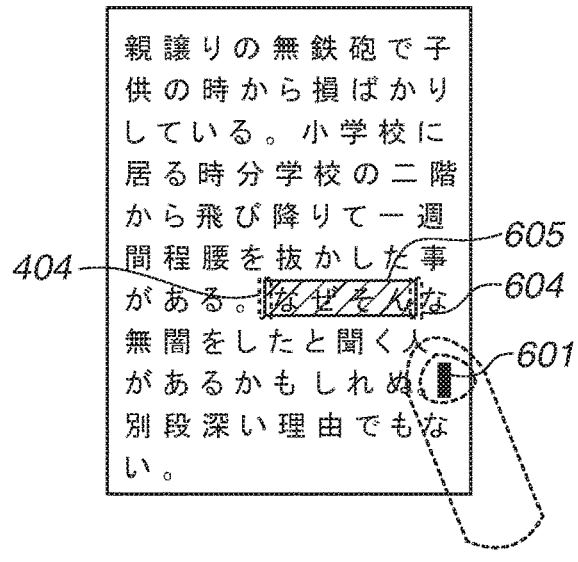

Then, as illustrated in FIG. 6D, the start point of the selection range is fixed to the caret position 404. The selection range change unit 205 moves the end point from the caret position 404 toward the caret position 601 to change a range 605 to expand.

Another method for changing the selection range will be described. Since the caret position 601 is located behind the caret position 404 in terms of the arrangement of the character string, the change range determination unit 204, in step S305, determines the caret position 404 to be the initial position and the caret position 601 to be the target position. In step S307, the selection range change unit 205 then may initially deselect the range 402. The selection range change unit 205 then fixes the start point of a selection range to the caret position 404, and moves the end point from the caret position 404 toward the caret position 601 to expand the selection range.

According to the latter method, the state illustrated in FIG. 6A transitions to the state illustrated in FIG. 6C without the intervention of the state illustrated in FIG. 6B. The change of the range in step S307 is started at the state illustrated in FIG. 6C where there is no selection range.

Figure 6E:
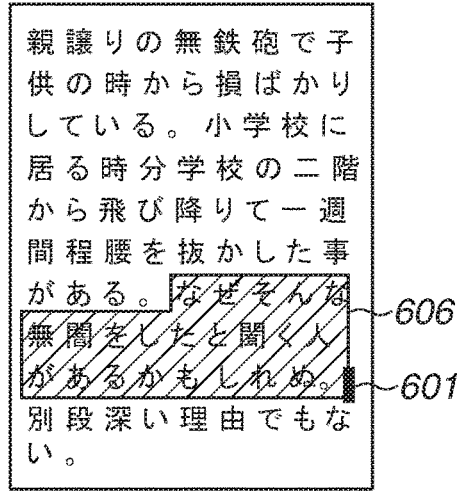

FIG. 6E illustrates a state where the change of the range has advanced, the end point of the range 605 has reached the caret position 601, and the change of the selection range is stopped. A range 606 is the resulting selection range.

In FIGS. 4A to 6E, the display states of the touch panel when the selection range is changed by moving the start point of the already-selected range 402 to different positions have been described. If the end point, not the start point, of the range 402 is moved by a touch operation, an initial position and a target position can also be determined according to the processing flow of FIG. 3 to change the selection range with time.

<Appropriately Changing Speed at Which Start Point or End Point of Selection Range Moves>

An example of processing by which the selection range change unit 205 determines a change speed at which the start point or the end point of the selection range is moved from the initial position to the target position will be described with reference to FIGS. 7A to 7E.

FIGS. 7A to 7E illustrate display states of a selection range according to time in a case where the end point of an already-selected range is moved further behind in terms of the arrangement of the character string by a touch operation.

Figure 7A:
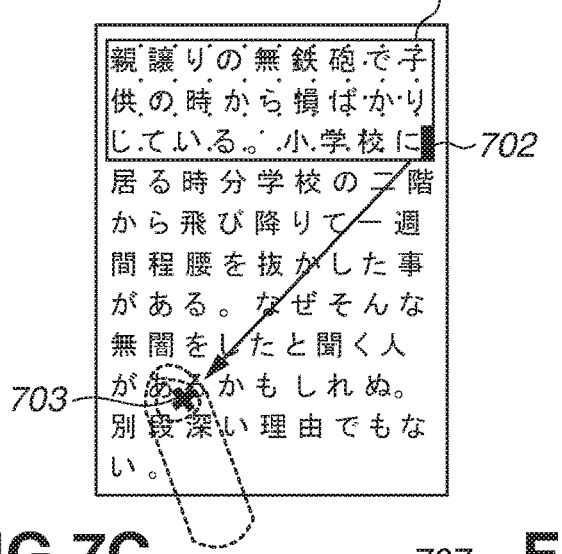
FIGS. 7A, 7B, 7C, 7D, and 7E are diagrams illustrating an example of a method for changing a selection range when an end point of a selection range is changed.

In FIG. 7A, a range 701 represents an already-selected range. A caret position 702 represents the end point of the range 701. Since the selection range 701 is assumed to be expanded by moving the caret position 702 to a touch position 703 by a touch operation, the initial position is the caret position 702.

Figure 8:
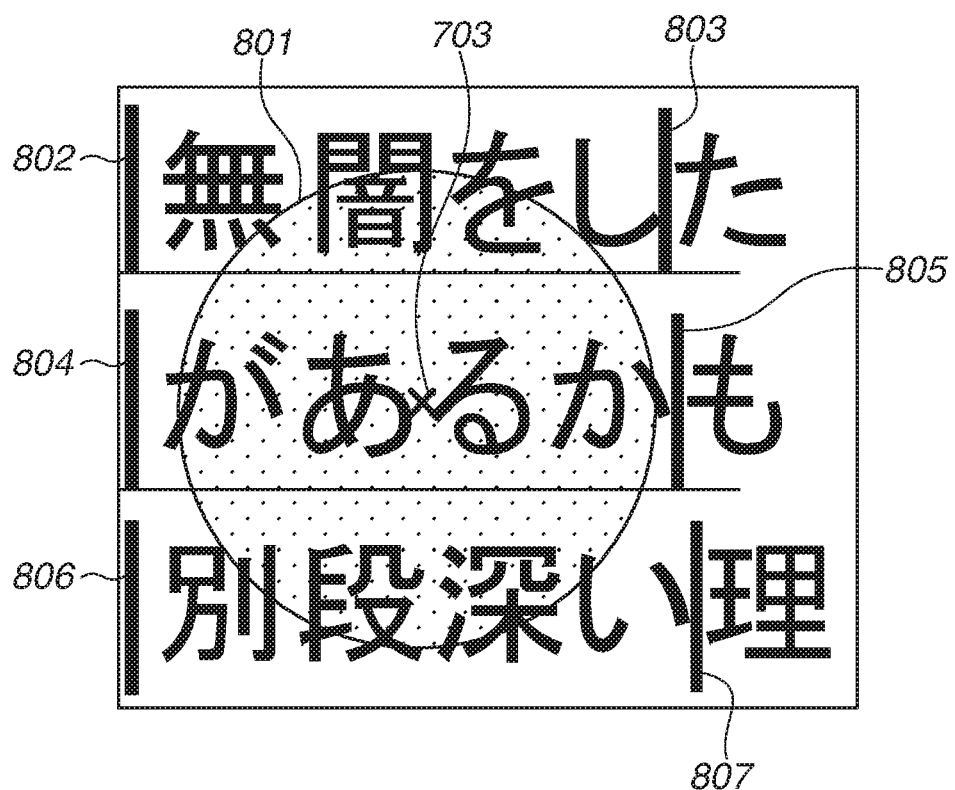
FIG. 8 is a diagram illustrating an example of a method for determining a target position based on input coordinates.

An example of a method for determining a target position by the change range determination unit 204 will be described with reference to FIG. 8. FIG. 8 illustrates an enlarged view of a vicinity of the touch position 703 illustrated in FIG. 7A. A circle 801 represents a range of r pixels in radius about the touch position 703. If the size of the characters displayed on the touch panel is small as compared to that of the user's fingertip, the positions of the start point and the end point of the selection range may be difficult to uniquely specify by a touch operation.

The change range determination unit 204 then assumes caret positions related to characters any part of which are included in the range of the circle 801 to be target position candidates. The value of the radius r can be such that the circumference of the circle 801 defined by the radius r lies outside an area hidden by the user's fingertip.

In the present exemplary embodiment, caret positions from one immediately before the first character to one immediately after the last character among the characters included in the range of the circle 801 on each line are assumed to be target position candidates. For example, on the first line that includes the range of the circle 801, all caret positions from a caret position 802 to a caret position 803 are assumed to be target position candidates. Target position candidates are similarly determined on the other lines that include the range of the circle 801.

The change speed of the start point or the end point of the selection range is reduced in or near the caret positions that are target position candidates.

Target position candidates may include caret positions related to characters vertically and horizontally adjoining the character(s) corresponding to the touch position 703. The method for determining target position candidates is not limited in particular.

In the example illustrated in FIG. 8, the characters corresponding to the touch position 703 refer to the second and third characters on the second line. The characters vertically and horizontally adjoining the second and third characters on the second line refer to the first to fourth characters on the first line, the first and fourth characters on the second line, and the first to fourth characters on the third line.

The caret positions related to those characters refer to all caret positions from the caret position 802 to the caret position 803, all caret positions from a caret position 804 to a carat position 805, and all caret positions from a caret position 806 to a caret position 807.

In the present exemplary embodiment, the caret position 807 that is located the farthest from the initial position (caret position 702) among the target position candidates illustrated in FIG. 8 in terms of the arrangement of the character string is assumed to be a final arrival position. If the selection range changed with time reaches the final arrival position, the change of the range is stopped. The caret positions between the caret positions 802 and 803, the caret positions between the caret positions 804 and 805, and the caret positions between the caret positions 806 and 807 serve as the target position candidates illustrated in FIG. 8.

Figure 7B:
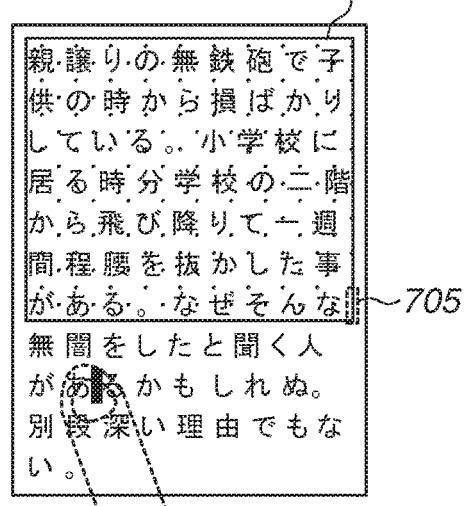

FIG. 7B illustrates a state when the range 701 has expanded to a range 704 with time, and the end point has reached a caret position 705. Since none of the target position candidates described in FIG. 8 lies in the range from the caret position 702 to the caret position 705, the selection range may be changed to expand in units of lines.

Figure 7C:
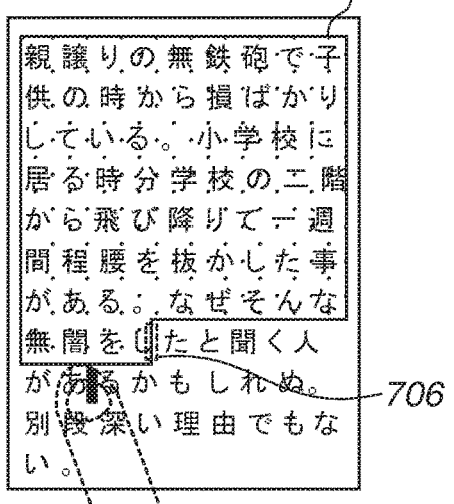

FIG. 7C illustrates a state when the range 704 has further expanded to a range 707 to reach the caret position 803 (corresponding to a caret position 706 of FIG. 7C) which is included in the range of the circle 801. As the selection range is changed from FIG. 7B to FIG. 7C, the end point of the selection range passes the caret positions 802 to 803 which correspond to target position candidates. The change speed of the range 707 (the moving speed of the end point) is thus reduced in the meantime.

Figure 7D:
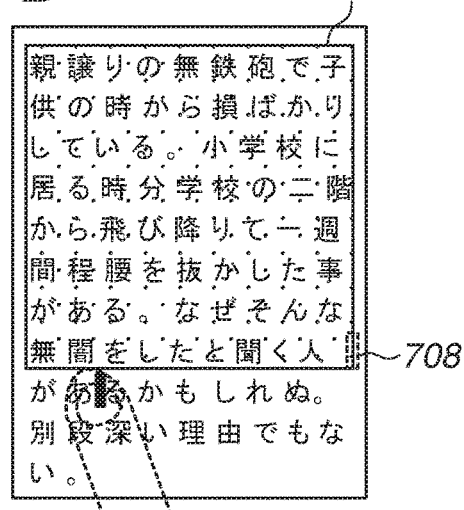

FIG. 7D illustrates a state of a range 709 when the range 707 has expanded and the end point has moved to a caret position 708. The change from the range 707 to the range 709 takes place on a line corresponding to the range of the circle 801 but in a portion that does includes any of the caret positions 802 to 803 serving as target position candidates. The selection range is thus changed (the end point is moved) at a speed lower than the change speed from FIG. 7A to 7D and higher than the change speed from FIG. 7B to 7C.

Figure 7E:
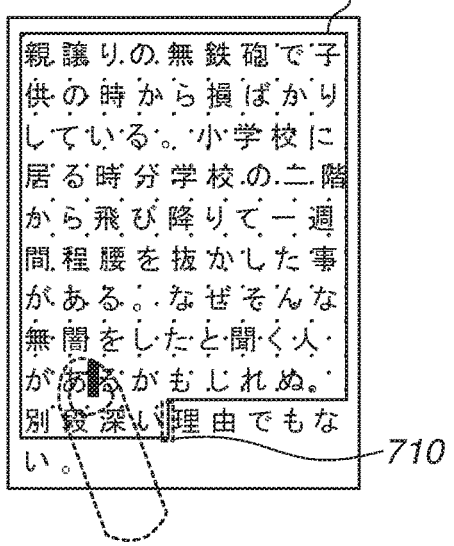

FIG. 7E illustrates a state of a range 711 when the end point of the range 709 has reached a caret position 710. The caret position 710 corresponds to the caret position 807 illustrated in FIG. 8, i.e., the final arrival position. The change of the selection range is stopped here.

An example of the change speed of the selection range in FIGS. 7A to 7E will be described.

On a line where there is no target position candidate, the end point of the selection range is moved at a change speed of 90 characters per second.

On a line where there are target position candidates, different change speeds are used
1) in the portion of the caret positions serving as the target position candidates (for example, the caret positions 802 to 803), and
2) in the other portion(s).

In the caret positions serving as the target position candidates, the end point of the selection range is moved at a change speed of 10 characters per second. In the other portion(s), the end point of the selection range is moved at a change speed of 50 characters per second.

Figure 9:
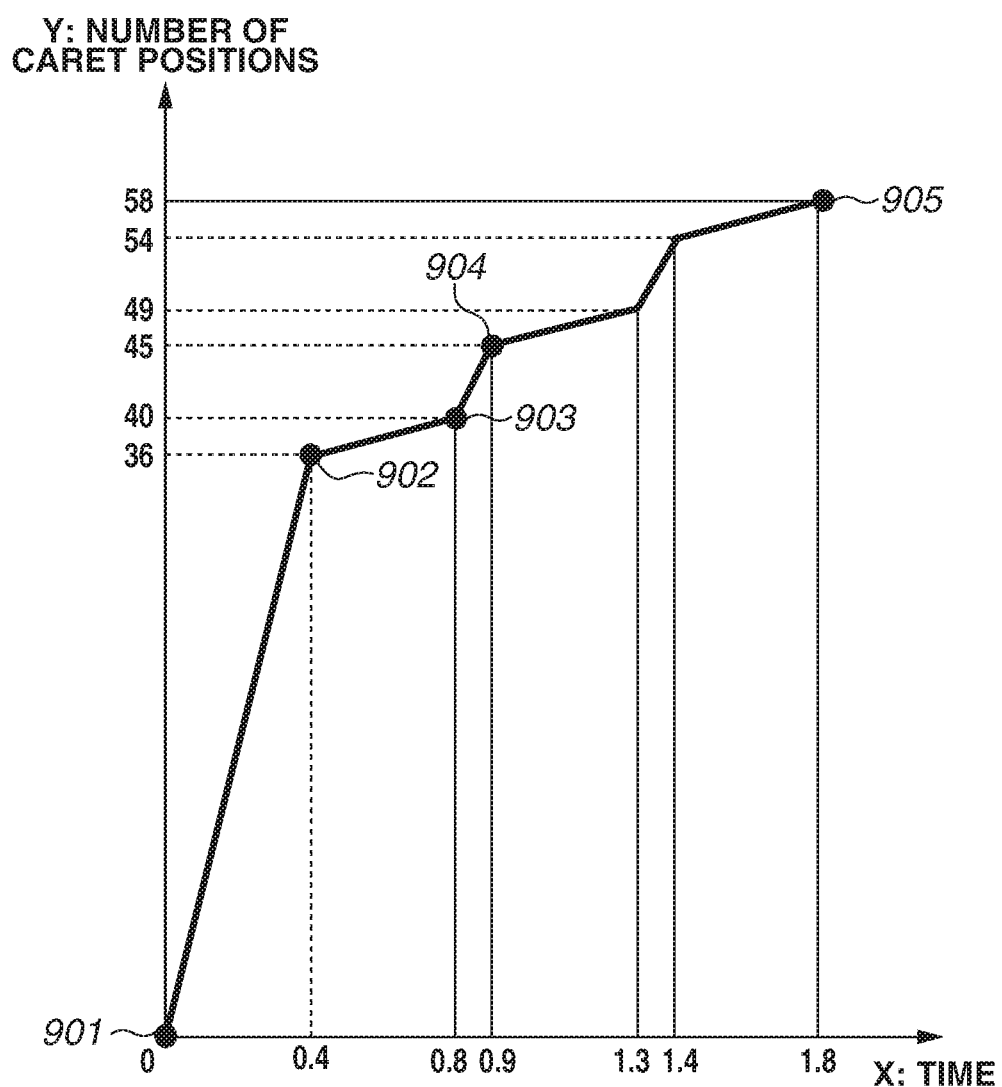
FIG. 9 is a graph illustrating an example of a change speed that is determined by the current selection range and the target position.

FIG. 9 is a graph illustrating the transition of the change speed of the selection range in FIGS. 7A to 7E.

The horizontal axis of FIG. 9 indicates time. The vertical axis of FIG. 9 indicates the number of moves (the number of caret positions) of the end point of the selection range. With a point of origin 901 at the bottom left, the point of origin 901 and points 902 to 905 indicate the change speed in the states of FIGS. 7A to 7E, respectively.

The caret position 702 of FIG. 7A corresponds to the point of origin 901 of FIG. 9. The caret position 705 of FIG. 7B corresponds to the point 902 of FIG. 9.

The lines from the caret position 702 of FIG. 7A to the caret position 705 of FIG. 7B do not include a target position candidate. The moving speed of the end point of the changed range is thus high, as illustrated by the gradient of the straight line connecting the points 901 and 902 of FIG. 9.

The caret position 706 of FIG. 7C corresponds to the point 903 of FIG. 9.

There are target position candidates in the portion between the first caret position of the line to which the caret position 706 belongs and the caret position 706. The moving speed of the end point of the changed range is thus low, as illustrated by the gradient of the straight line connecting the points 902 and 903 of FIG. 9.

The caret position 708 of FIG. 7D corresponds to the point 904 of FIG. 9.

There is no target position candidate in the portion from the caret position 706 of FIG. 7C to the caret position 708 of FIG. 7D. The moving speed of the end point of the changed range is thus intermediate, as illustrated by the gradient of the straight line connecting the points 903 and 904 of FIG. 9.

As described above, the change speed of the display state of the selection range is 1) increased in portions where there is no target position candidate or near which there is no target position candidate, and 2) reduced in portions where there is a target position candidate or near which there is a target position candidate.

This results in 1) less user discomfort due to a low change speed of the display state of the selection range. In addition, 2) the user can be prevented from failing to determine a target position due to a high change speed of the display state of the selection range (from determining a position in front of or past an intended position to be a target position).

Like from FIG. 7A to FIG. 7B, if the change of the selection range takes place over lines without a target position candidate, the selection range may be expanded in units of lines. Alternatively, when the caret position 702 is moved to the touch position 703, the range 704 may be highlighted at the same time (i.e., portions having no target position candidate may be instantly highlighted) and the caret position 705 may be assumed to be the initial position of the change of the range.

Next, an example of expanding a selection range of a display content including an English character string by moving the end point of the selection range will be described. FIGS. 15A to 15E illustrate a display state of the touch panel in changing the end point of the selection range partially selecting the English character string by a touch operation. A description redundant with the example of the Japanese content described with reference to FIGS. 4A to 4F will be omitted below, and differences will be mainly described.

FIG. 15A illustrates a state where a selection range 1502 is already selected from a character string displayed on a touch panel 1501. Caret positions corresponding to the start point and the end point of the selection range 1502 are illustrated as caret positions 1503 and 1504, respectively. In FIG. 15A, a caret indicating the current editing position is displayed in a caret position 1503.

In FIG. 15B, the user's finger 1512 is in touch with a touch position 1505 to input an operation for moving the caret position 1504 which defines the end point of the range 1502. In step S301, the input acceptance unit 201 accepts the input that the touch position 1505 is touched. The touch position 1505 is closer to the caret position 1504 than to the caret position 1503. In step S305, the change range determination unit 204 determines the caret position 1504 to be the initial position. The change range determination unit 204 then determines a caret position 1506 immediately after the word "There" closest to the touch position 1505 to be the target position. FIG. 15C illustrates the situation. In such a manner, if the content is written in English, caret positions may be set word by word.

FIG. 15C illustrates a state where the caret is displayed in the caret position 1506. FIG. 15D illustrates the point in time when the end point of the selection range reaches a caret position 1507 in the process of moving toward the caret position 1506 at a speed with which the movement of the end point of the selection range is visually observable. A selection range 1511 here is wider than the range 1502. The end point of the range 1511 has not yet reached the caret position 1506 which is the target position (NO in step S306; the processing proceeds to step S307). Suppose that the user releases the finger 1512 from the touch panel 1501 here. In other words, the pointing is ended (YES in step S309) at the point in time of FIG. 15D. FIG. 15E illustrates the result.

In the example of FIGS. 15A to 15E, the caret position 1506 set as the target position is different from the target position desired by the user himself/herself. However, in the present exemplary embodiment, as described above, the user can determine the desired selection range by releasing the finger 1512 from the touch panel 1501 at the point in time when the end point of the selection range is visually observed to have reached the desired position. In other words, in the present exemplary embodiment, the speed at which the start point or the end point is moved is limited to a speed with which the movement of the start point or the end point is recognizable by the human eye so as to facilitate the user's adjusting the timing to end the pointing. In addition to the reduction of the speed, for example, the start point or the end point may be temporarily stopped each time the start point or the end point reaches a caret position or one of a plurality of target position candidates. In such a case, if the pointing is not ended while the movement is temporarily stopped, the movement is resumed.

A second exemplary embodiment will be described below. For a hardware configuration according to the present exemplary embodiment, see FIG. 1 described in the first exemplary embodiment. The present exemplary embodiment may be applied if no range is selected in the initial state of the first exemplary embodiment and both the start point and the end point of a selection range are specified in such a state. In the present exemplary embodiment, processing when an input of the coordinates of two points, the start point and the end point of a selection range, is accepted by a multi-touch input operation will be describe with reference to a processing flow illustrated in FIG. 10 and with reference to FIGS. 11A to 11F. A description of the steps designated by the same reference numerals in FIG. 10 as in FIG. 3 will be omitted.

Suppose that 1) there is no selection range selected, and 2) the input acceptance unit 201 accepts a first input position by first pointing and accepts a second input position by second pointing while the first pointing continues. In such a case, the selection range acquisition unit 202 acquires a selection range with either one of the first and second input positions as a start point and the other as an end point.

FIGS. 11A to 11F illustrate a display state of the touch panel when a start point and an end point for range selection are input by a touch operation in a state where no range is selected from the character string displayed on the touch panel.

In step S301, the input acceptance unit 201 accepts, in FIG. 11A, an input of the coordinates of a start point 1101 and an end point 1102 for selecting a range by a touch operation. While the present exemplary embodiment assumes an input operation by multi-touch, the input method is not limited to multi-touch.

Which of the two input-accepted points is the start point is determined by a positional relationship between the accepted coordinates. As employed herein, the start point and the end point are determined based on the coordinates with the top left of the touch panel as the point of origin. In step S1001, if the coordinates accepted in step S301 are those of one point (NO in step S1001), the processing of the range selection ends. If the coordinates accepted in step S301 are those of two points (YES in step S1001), the processing proceeds to step S304. In step S1002, the change range determination unit 204 determines an initial position and target positions on a start point side and an end point side.

In FIG. 11B, the target position on the start point side is a caret position 1104 immediately before the character corresponding to the coordinates of the start point 1101. The target position on the end point side is a caret position 1105 immediately after the character corresponding to the coordinates of the end point 1102. Between caret positions before and after a character corresponding to the coordinates of a midpoint 1103 between the start point 1101 and the end point 1102, the initial position is a caret position 1106 that is closer to the midpoint 1103.

Figure 10:
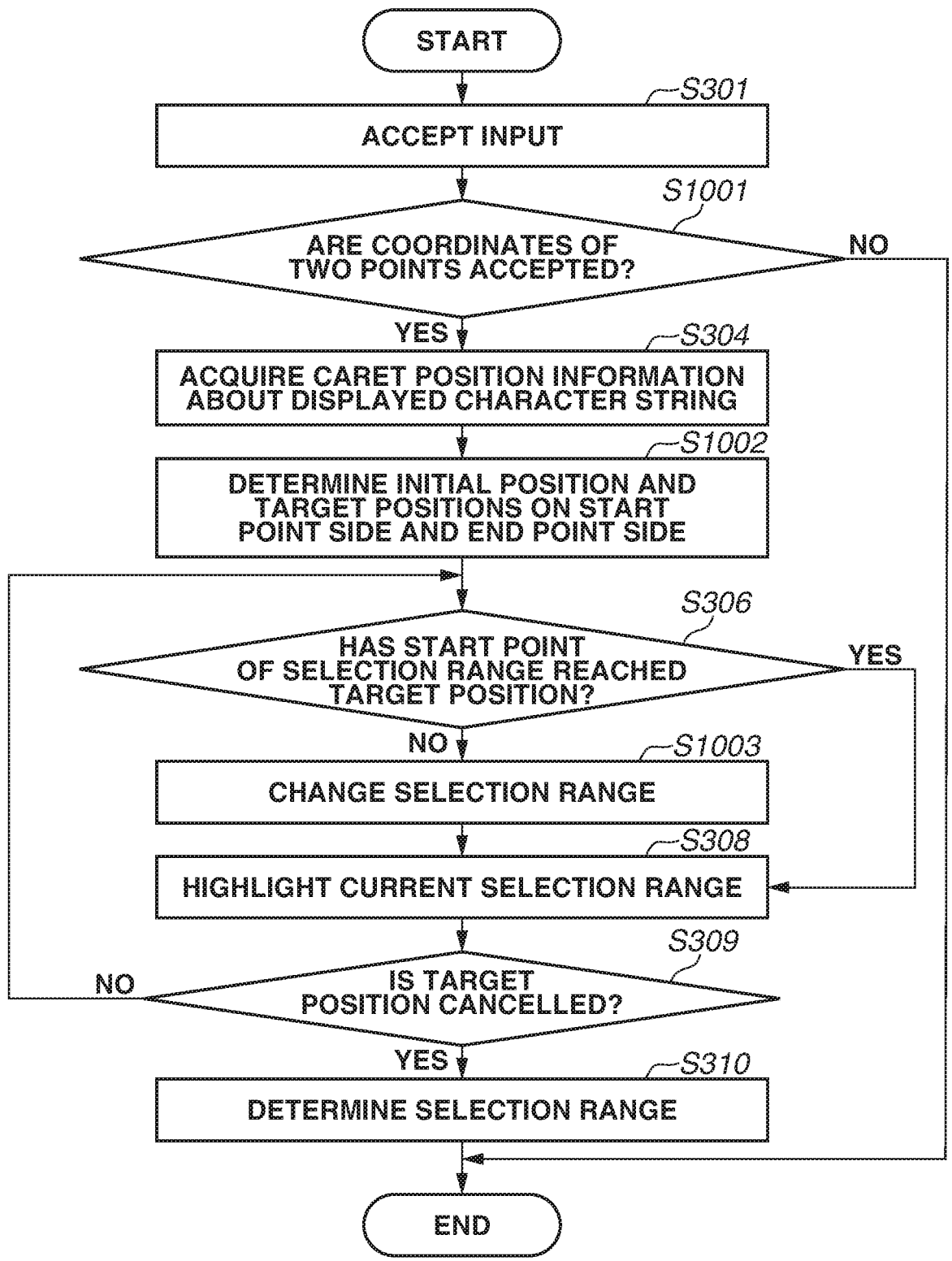
FIG. 10 is a flowchart illustrating an example of a processing flow for selecting a range.

In step S1003, the selection range change unit 205 starts to change the range from the initial position. The selection range change unit 205 changes the selection range to expand in two directions, namely, to the start point side and to the end point side. The changes in the two directions may be made simultaneously, or independently at different timing. The change speeds in the respective two directions may be independently determined. If the changes in the two directions are simultaneously made, the user needs to visually observe both the start point side and the end point side at the same time. This results in a complicated operation. Then, in the present exemplary embodiment, processing for making changes in the two directions independently will be described. The processing for changing the range to the start point side is similar to that for changing the range to the end point side. The processing subsequent to step S1003 of FIG. 10 is the same as that of FIG. 3. A description thereof will thus be omitted.

As illustrated in FIG. 11C, the selection range change unit 205 moves the start point of a range 1107 to approach the caret position 1104 from the caret position 1106 at a constant rate. The end point of the range 1107 is fixed to the caret position 1106.

FIG. 11D illustrates a state where the start point of the range 1107 has reached the caret position 1104. If the user releases the finger specifying the start point 1101 of the selection range by the touch operation from the operation panel here, the cancellation of the input coordinates on the start point side is accepted. The selection range change unit 205 determines the start point of the selection range to be the caret position 1104, and starts to change the range to the end point side.

In FIG. 11E, the selection range change unit 205 moves the end point of a range 1108 to approach the caret position 1105 from the caret position 1106 at a constant rate as with the case of the start point. The start point of the range 1108 is fixed to the caret position 1106.

FIG. 11F illustrates a state where the range 1108 is expanded and the end point of the range 1108 has reached the caret position 1105. If the user releases the finger specifying the end point 1102 of the selection range from the operation panel here, the cancellation of the input coordinates on the end point side is accepted. The end point of the selection range is determined to be the caret position 1105, and a union of the ranges 1107 and 1108 is determined to be the selection range.

Another method for determining the position of the start point in step S1002 of FIG. 10 will be described with reference to FIGS. 12A to 12D. Suppose that the input accept unit 201 accepts the coordinates of the start point and the end point of a selection range by a touch operation. As illustrated in FIG. 12A, the target position on the start point side is determined to be a caret position 1201 and the target position on the end point side is determined to be a caret position 1202 as with the description of FIG. 11A. FIG. 12B illustrates a state where a range 1205 is highlighted as a selection range, with the last caret position 1203 of the line to which the caret position 1201 belongs as a start point and the first caret position 1204 of the line to which the caret position 1202 belongs as an end point.

The caret position 1203 is assumed to be the initial position on the start point side. The caret position 1204 is assumed to be the initial position on the end point side. FIG. 12C illustrates a state when the selection range is expanded from the caret position 1203 toward the caret position 1201.

The end point of a range 1206 is fixed to the caret position 1203. The start point of the range 1206 is moved to approach the caret position 1201 from the caret point 1203. If the start point of the range 1206 reaches the caret position 1201 or if the user releases the finger on the start point side from the touch panel and the cancellation of the input coordinates on the start point side is accepted before the start point reaches the caret position 1201, the selection range change unit 205 starts to change the selection range to the end point side. FIG. 12D illustrates a state immediately before the start point of the range 1206 reaches the caret position 1201, the cancellation of the input coordinates on the start point side is accepted, and the selection range starts to be changed to the end point side. Since the change of the range to be selected to the end point side is performed by similar processing, a description thereof will be omitted.

A third exemplary embodiment will be described. If an input of a start point of an end point of a selection range by a touch operation is accepted, a highlighted range is changed with time to approach the input position. FIGS. 13A to 13D illustrate a display state of the touch panel when the position of the start point of which the input is initially accepted is moved by a touch operation before the selection range is determined. Such processing will be described according to a processing flow illustrated in FIG. 14.

Figure 13A:
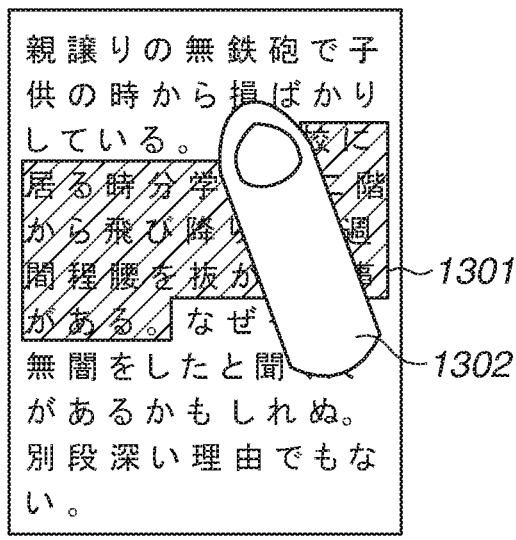
FIGS. 13A, 13B, 13C, and 13D are diagrams illustrating an example of a display state when the start point of a specified selection range is changed.

FIG. 13A illustrates a state where the start point of the selection range of a character string displayed on the touch panel is specified by a touch operation. A highlighted range 1301 has already reached near the start point specified by a finger 1302. The finger 1302 is not released from the touch panel, and the section range has not yet been determined. Here, the finger 1302 covers a part of the touch panel, and the operator is unable to view details of how far the character string is highlighted. The operator may therefore be unable to find out exactly how far the character string is highlighted.

Figure 13B:
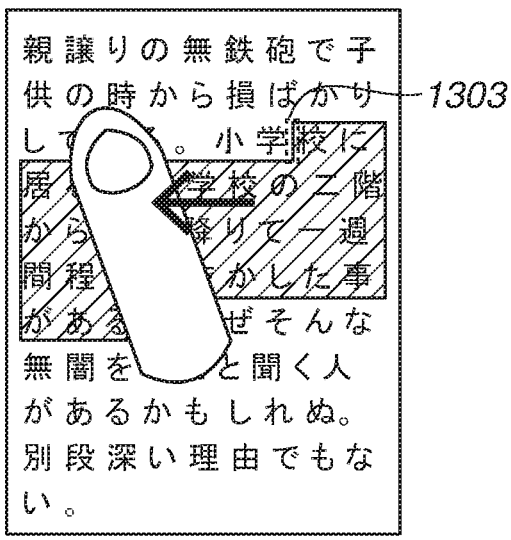

As illustrated in FIG. 13B, the operator then slides the finger 1302 touching the touch panel from the initially-specified position to make the end of the highlighted range visually observable, and checks the end of the highlighted range. Here, the position of the start point is changed without the input of the start point of the selection range being cancelled. The finger 1302 may be slid in any direction. In the present exemplary embodiment, the finger 1302 is slid in the same direction as that in which the range 1301 has been expanded to enter the state of FIG. 13A.

Figure 14:
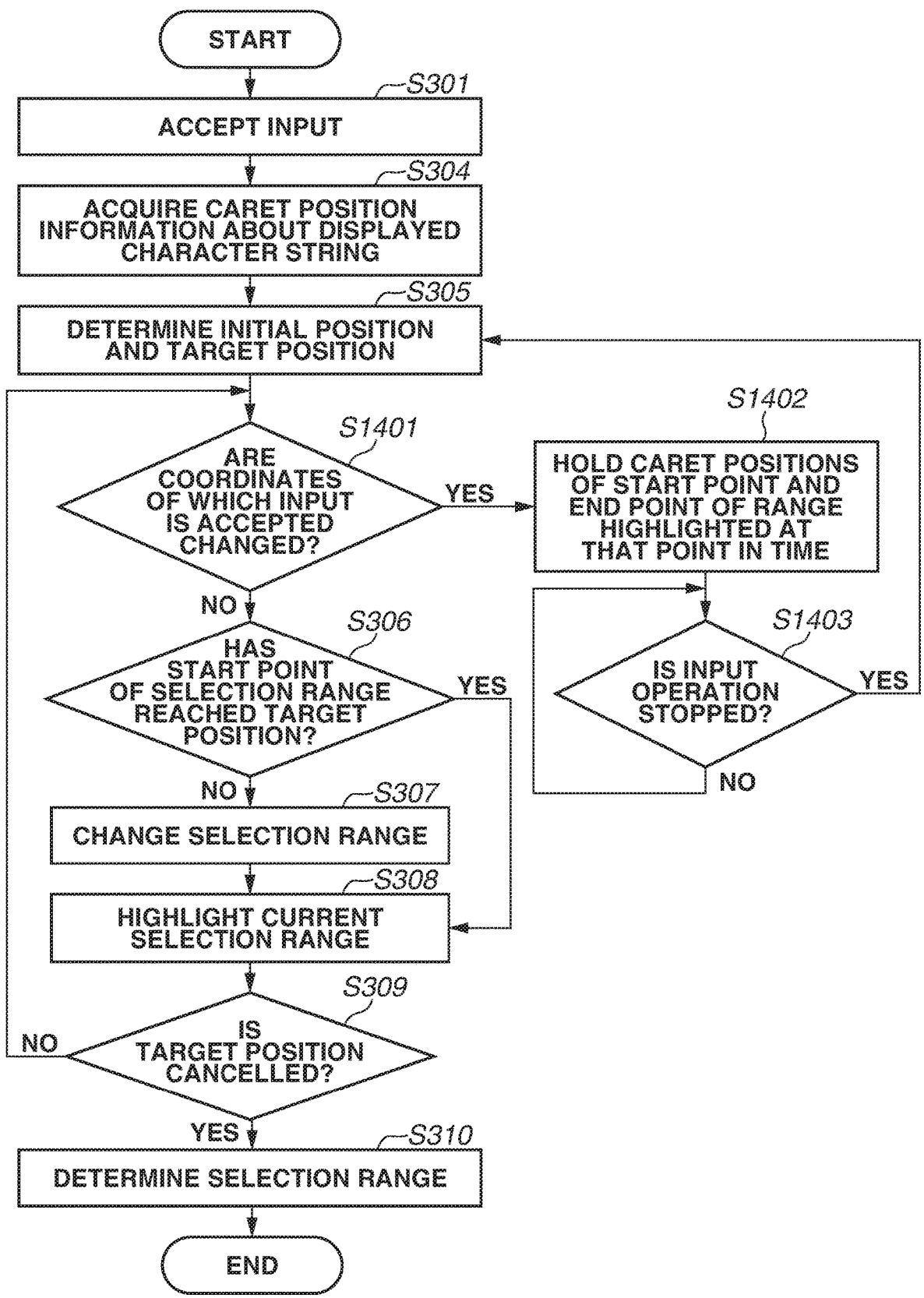
FIG. 14 is a flowchart illustrating an example of a processing flow when the start point of a specified selection range is changed.

In FIG. 14, similar processing to that of FIG. 3 is designated by the same step numbers. A description of such processing will be omitted. After the change range determination unit 204 determines an initial position and a target position in step S305, in step S1401, whether the coordinates, the input of which is accepted, (the coordinates of the target position) are changed is determined, until the input by the touch operation is determined to be cancelled in step S309. If the coordinates, the input of which is accepted, (the coordinates of the target position) are not changed (NO in step S1401), the processing proceeds to step S306.

If the coordinates of the start point or the end point input by the touch operation is changed as illustrated in FIG. 13B (YES in step S1401), then in step S1402, the caret positions of the start point and the end point of the range highlighted at that point in time are held. In step S1403, if the coordinates accepted by the touch operation are changed within a predetermined time, the input operation is determined to not be stopped (NO in step S1403) and other processing is not performed. If the coordinates accepted by the touch operation are not changed within the predetermined time (YES in step S1403), the processing proceeds to step S305. In step S305, the change range determination unit 204 determines an initial position and a target position based on the input coordinates at that point in time.

Figure 13C:

In FIG. 13C, a range 1305 starts to be changed based on a caret position 1303 of the initial position and a caret position 1304 of the target position determined from the position where the slide operation of the finger 1302 is stopped.

Figure 13D:
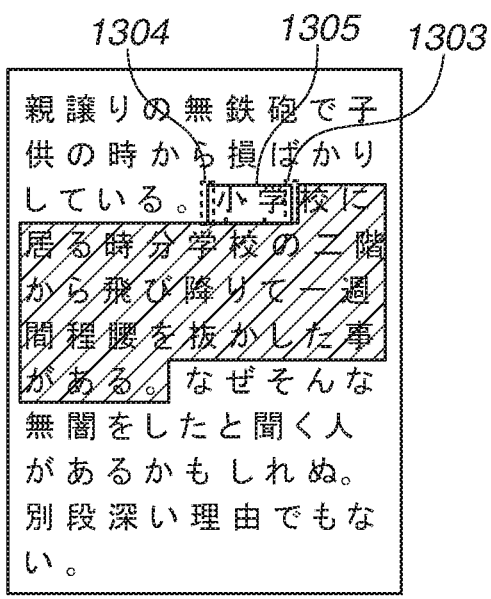

As illustrated in FIG. 13D, if the cancellation of the input by the touch operation is accepted when the start point of the range 1305 reaches the caret position to be selected, the change of the range 1305 is stopped, and a union of the ranges 1301 and 1305 is determined to be the selection range.

According to the present exemplary embodiment, the user can stop the change of the range in a state where the caret position to stop the change of the range is not hidden by the user's own finger, i.e., while directly viewing the caret position to stop the range of the range.

According to an exemplary embodiment of the present disclosure, a display apparatus that reduces erroneous selections during range selection by a touch operation can be provided.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-083614, filed Apr. 15, 2015, which is hereby incorporated by reference herein in its entirety.

What is claimed is:

1. An apparatus comprising:
one or more processors which, when executing instructions, causes the apparatus to:
explicitly indicate a selected range of a character string being in a selected state in display content displayed on a display unit, the selected range having a start and an end caret respectively positioned at a beginning and an end of the selected range;

accept a position pointed in the display content, wherein the accepted position is pointed by touching on a touch panel that acquires position information about where an object serving as a pointer is detected to be in contact with or in proximity to on the display unit;

determine either the start or the end caret as being closest to the accepted position;

determine whether the accepted position is being pointed without movement outside or inside the selected range; and in a case where the accepted position is being pointed without movement outside the selected range, gradually add one or more characters, which lie between the determined closest start/end caret and a character corresponding to the pointed position, to the selected range while gradually repositioning the determined closest start/end caret towards the character corresponding to the pointed position, wherein the gradual adding is performed at a speed that changes according to a distance between a current repositioned start/end caret and the pointed position, and in a case where the accepted position is being pointed without movement inside the selected range, gradually exclude one or more characters, which lie between the determined start/end caret and the character corresponding to the pointed position, from the selected range while gradually repositioning the determined closest start/end caret towards the character corresponding to the pointed position, wherein the gradual exclusion is performed at a speed that changes according to a distance between a current repositioned start/end caret and the pointed position, and wherein the accepted position does not occur at a same time outside and inside the selected range.

2. The apparatus according to claim 1, wherein the apparatus gradually adds one or more characters to the selected range or gradually excludes one or more characters from the selected range, at a speed with which addition or exclusion of a character is recognizable by a human eye.

3. The apparatus according to claim 1, wherein the apparatus gradually adds one or more characters to the selected range or gradually excludes one or more characters from the selected range, at a speed determined according to a number of characters lying between a current position of the start/end character and the pointed position.

4. The apparatus according to claim 1, wherein the apparatus gradually adds one or more characters to the selected range or gradually excludes one or more characters from the selected range, at a speed determined according to a distance between a current position of the start/end character and the pointed position.

5. An apparatus comprising:
one or more processors which, when executing instructions, causes the apparatus to:
cause a display unit to display content;
select a portion of a character string in the display content, the selected portion having a start and an end caret respectively positioned at a beginning and an end of the selected portion;
accept a certain position within the character string that is separate from the start/end caret of the selected portion by a pointing to the certain position within the character string, wherein the accepted position is pointed by touching on a touch panel that acquires position information about where an object serving as a pointer is detected to be in contact with or in proximity to on the display unit;
determine either the start or end caret as being closest to the certain position; and
gradually exclude one or more characters which lie between the determined closest start/end caret and the character corresponding to the certain position from the selected portion, while gradually repositioning the determined closest start/end caret of the selected portion towards the character position corresponding to the certain position at a speed that changes according to a distance between a current repositioned start/end caret and the certain position,
wherein the gradual exclusion of the start/end caret is recognizable by a human eye while the pointing is continued at the certain position in a stationary state, and stop the movement according to an end of the pointing.

6. The apparatus according to claim 5, wherein the speed at which the start/end caret of the selected portion being in the selected state is moved by the apparatus is determined according to a number of characters lying between a current position of the start/end caret and the certain position.

7. The apparatus according to claim 5, wherein the speed at which the start/end caret of the selected portion being in the selected state is moved by the apparatus is determined according to a distance between a current position of the start/end caret and the certain position.

8. The apparatus according to claim 5,
wherein in a case where the certain position is outside an area in which the selected portion being in the selected state is displayed, the apparatus adds one or more characters to the selected portion being in the selected state according to the movement of the start/end caret, and
wherein in a case where the certain position is in the area in which the selected portion being in the selected state is displayed, the apparatus successively excludes one or more characters from the selected portion being in the selected state according to the movement of the start/end caret.

9. The apparatus according to claim 5, wherein the apparatus detects, of the start caret and the end caret of the selected portion being in the selected state in the character string, one being closer to the certain position accepted by the apparatus as a target to be moved until the pointing is ended.

10. The apparatus according to claim 5,
wherein the apparatus acquires position information indicating a partial area where an object serving as a pointer is in contact with or in proximity to a surface of a touch panel included in the display unit, and
wherein the apparatus detects, among separations of a plurality of phrases in the displayed character string, a separation included in the partial area as a candidate of a destination to which the start/end caret of the selected portion being in the selected state is moved.

11. The apparatus according to claim 5, wherein the apparatus changes the speed at which the start/end caret of the selected portion being in the selected state moves, each time the start/end caret reaches a position serving as a candidate of a destination to which the start/end caret is moved.

12. The apparatus according to claim 11, wherein in a case where the pointing is not ended while the movement is temporarily stopped, the apparatus resumes the movement.

13. The apparatus according to claim 5, wherein the apparatus moves the start/end caret being moved at the speed, with which the movement of the start/end caret is recognizable by the human eye, so that the start/end caret advances by a distance corresponding to one word included in the displayed character string in a predetermined unit time.

14. The apparatus according to claim 5, wherein in a case where the pointing is not ended even after the start/end caret being moved at the speed with which the movement of the start/end caret is recognizable by the human eye reaches the certain position, the apparatus resumes moving the start/end caret.

15. The apparatus according to claim 5, wherein the apparatus explicitly indicates the selected portion being in the selected state in the character string displayed on the display unit, and updates the explicitly-indicated portion at a same speed as that at which the start/end caret is moved by the apparatus.

16. The apparatus according to claim 5, wherein in a case where the start/end caret of the selected portion being in the selected state reaches the character position corresponding to the certain position, the apparatus stops the movement.

17. The apparatus according to claim 5, wherein in a case where a change of the certain position is accepted within a predetermined time from when the start/end caret of the portion being in the selected state starts being moved, the apparatus stops a change of the selected portion being in the selected state.

18. The apparatus according to claim 5,
wherein in a case where a change of the certain position is accepted within a predetermined time from when the start/end caret of the selected portion being in the selected state starts being moved, the apparatus stops a change of the selected portion being in the selected state, and
wherein in a case where a change of the certain position is not accepted within a predetermined time thereafter, the apparatus resumes the movement.

19. The apparatus according to claim 5, wherein in a case where there is no selected character string in the displayed character string and the apparatus accepts a first input position by a first pointing of multi-touch and accepts a second input position by a second pointing while the first pointing continues, the apparatus acquires a selected portion being in a selected state with either one of the first and second input positions as a start point and the other as an end point.

20. A method comprising:
explicitly indicating a selected range of a character string being in a selected state in display content displayed on a display unit, the selected range including start and an end caret respectively positioned at a beginning and an end of the selected range;
accepting a position pointed in the display content, wherein the accepted position is pointed by touching on a touch panel that acquires position information about where an object serving as a pointer is detected to be in contact with or in proximity to on the display unit;
determining either the start or the end caret as being closest to the accepted position;
determining whether the accepted position is being pointed without movement outside or inside the selected range; and
in a case where the accepted position is being pointed without movement outside the selected range, gradually add one or more characters, which lie between the determined closest start/end caret and a character corresponding to the pointed position, to the selected range while gradually repositioning the determined closest start/end caret towards the character corresponding to the pointed position;
wherein the gradual adding is performed at a speed that changes according to a distance between a current repositioned start/end caret and the pointed position, and
in a case where the accepted position is being pointed without movement inside the selected range, gradually exclude one or more characters, which lie between the determined start/end caret and the character corresponding to the pointed position, from the selected range while gradually repositioning the determined closest start/end caret towards the character corresponding to the pointed position;
wherein the gradual exclusion is performed at a speed that changes according to a distance between a current repositioned start/end caret and the pointed position,
wherein the accepted position does not occur at a same time outside and inside the selected range.

* * * * *